June 23, 1970  L. D. JENSEN  3,516,406
APPARATUS AND METHOD FOR REPLACING A PROLAPSED UTERUS
Filed Oct. 9, 1967  2 Sheets-Sheet 1
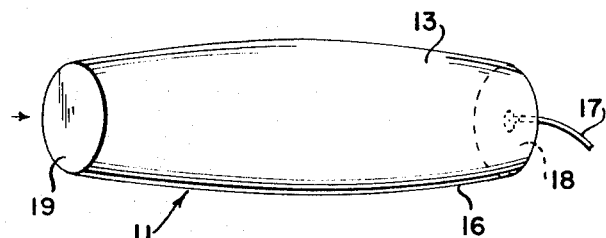
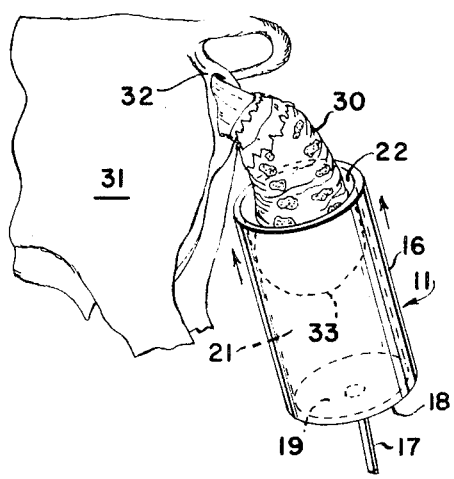
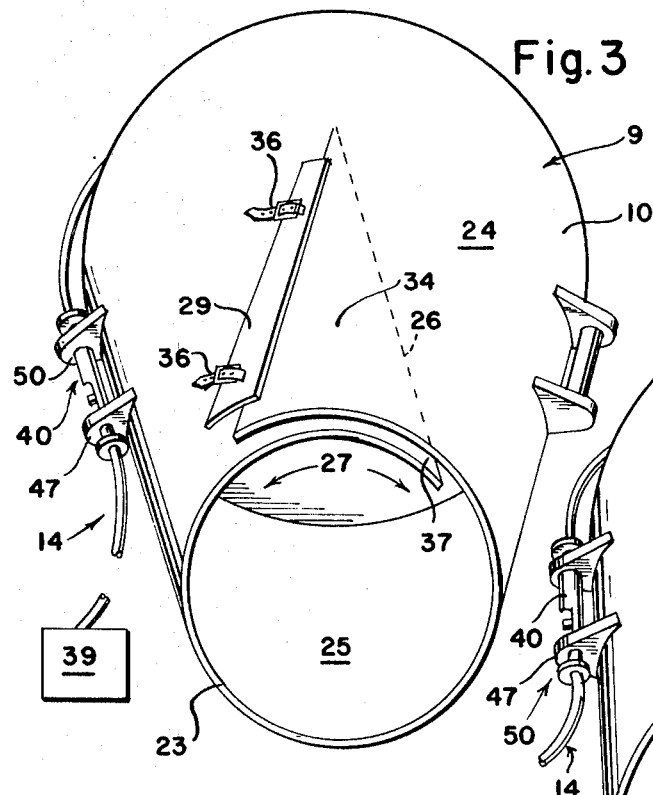
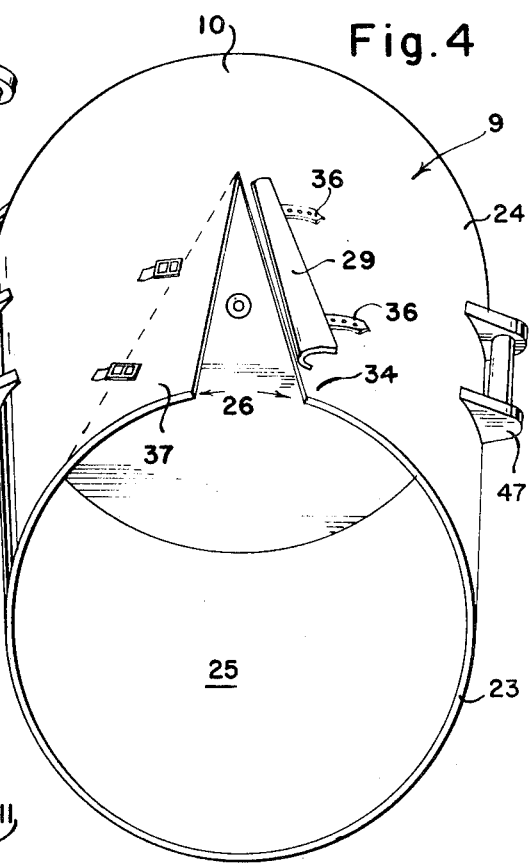
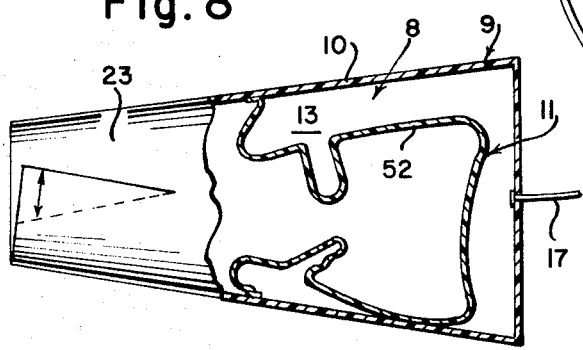
INVENTOR.
Leland D. Jensen
BY
Pearson + Pearson
ATTORNEYS

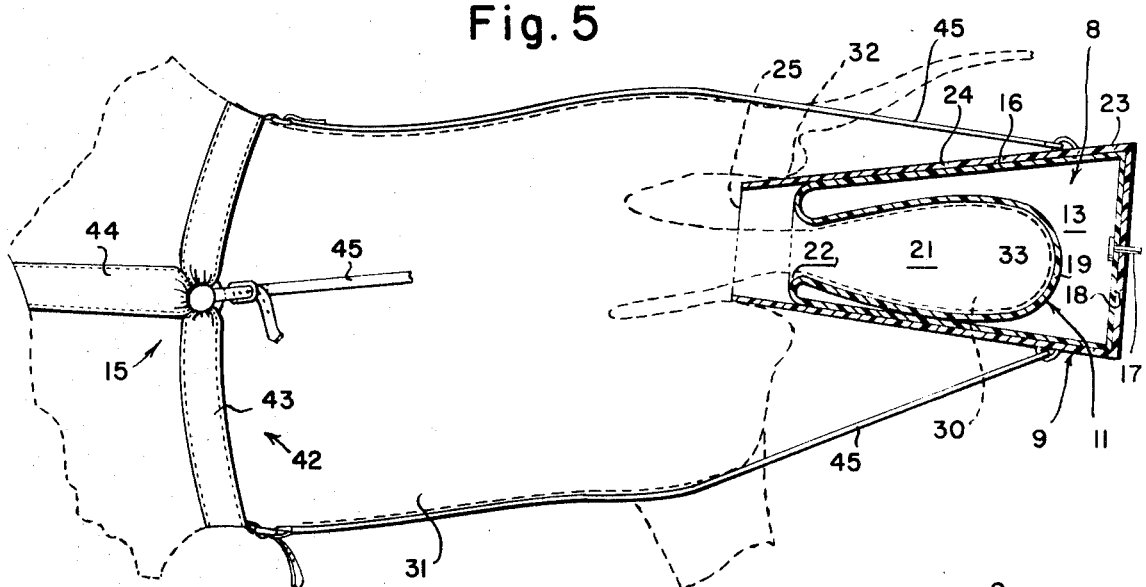
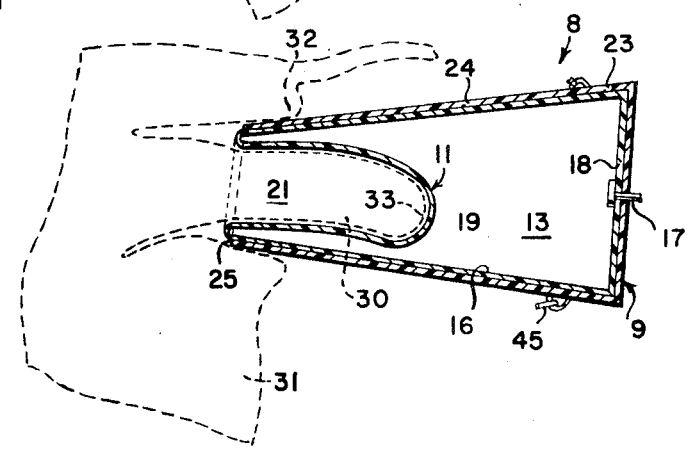
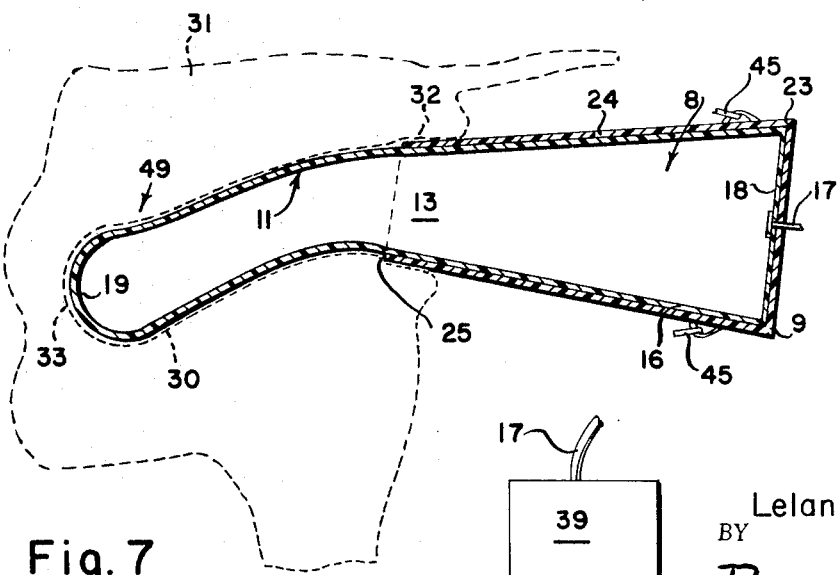

3,516,406
APPARATUS AND METHOD FOR REPLACING A
PROLAPSED UTERUS
Leland D. Jensen, 225 Main St., Saco, Maine 64072
Filed Oct. 9, 1967, Ser. No. 673,670
Int. Cl. A61d 1/08; A61b 17/42
U.S. Cl. 128—303                                 12 Claims

ABSTRACT OF THE DISCLOSURE

An apparatus and method for facilitating the reorientation and replacement of a prolapsed uterus in mammals, for example a cow or the like; said apparatus comprising a flexible and inflatable bag member for reception of a prolapsed uterus, an outer casing for holding said bag and having attached to said outer casing a fluid pressurizing means. By applying controlled fluid pressure to said inflatable bag member, a prolapsed uterus may be progressively reduced in size and pressured back into the abdominal cavity.

BACKGROUND

Prolapse of the uterus is a serious problem in the veterinary art, occurring chiefly in cows and ewes. Although its precise cause is not clear, its nature places it in the category of tubular invaginations in that the uterus is pulled or pushed or both, out through the animal's vagina. In being so displaced, the uterus must invaginate or turn itself inside out like a glove so that the inner surface thereof, i.e. the endometrium, is exposed.

Initially such a prolapsed uterus is not large; however after about four to six hours it can become very large indeed. This growth is in large part due to edema (excessive fluids in the tissues) caused by a lack of circulation of blood in the organ. A badly distended uterus can reach a diameter of eighteen inches and hang to the hocks.

Return of such a prolapsed uterus has heretofore been achieved by manual force. This operation is often facilitated by using tackle to draw up the animal's hindquarters and by using sedatives to make the animal less recalcitrant during the operation.

These methods have not been altogether satisfactory for a number of reasons. Cotyledons on the exposed surface of the prolapsed uterus are too often destroyed. If too many are destroyed the cow becomes useless for healthy reproduction. Since the veterinarian often arrives to replace the prolapsed uterus many hours after the occurrence of the prolapse, the uterus is often infected, lacerated, and hemorrhaging. Moreover, accidental holes are easily punched in the uterus when it is handled in a distended condition. Another factor contributing to the difficulty of the operation is the fact that a dose of anesthetic required to completely restrain the animal may make her unable to stand. A standing position, is preferable for carrying out the replacement operation.

Thus, the problem is to replace a fragile organ, swollen to two or three times the diameter of the vagina through which it must be returned, with as little damage to the organ and with as little discomfort to the animal as is possible. Unless the uterus is returned, it must be amputated. If this were done, the cow would cease to be of value as a milk producer and would be slaughtered. Typically, the loss to the farmer would run to several hundred dollars for each younger, heavy producing, or good beef breeding, cow so lost.

SUMMARY

Thus it is a principal object of the invention to provide an apparatus and method for replacing a prolapsed uterus with a minimum damage thereto, minimum discomfort to the animal and a minimum of effort by the veterinarian.

Another object of the invention is to provide an apparatus for returning a prolapsed uterus which can be manipulated when necessary by a single operator.

Other objects of the invention will be obvious to those skilled in the art on reading the instant invention.

The above objects have been substantially achieved by provision of an apparatus comprising a frustro-conical casing having a tapered smaller end which end forms an expansible aperture and guide for communication between said casing and the birth canal of the animal being treated. The casing includes means for enlarging the aperture to admit the uterus into the casing and includes biasing means so that, once the uterus is enclosed therein the aperture can adjust in size in response to internal pressures and external pressures on the casing. A flexible diaphragm or bag-like member is mounted in the casing and provides a cup shaped receptacle means for enveloping and receiving the uterus. A fluid-pressure chamber and source, provides means for controllably increasing the pressure within the casing and, consequently on the uterus thereby reducing the uterine mass in size and then forcing the uterus through the aforesaid aperture and back into the abdominal cavity of the animal.

DRAWINGS

In the drawings:

FIG. 1 is a plan view of the sausage shaped plastic bag of the invention when inflated;

FIG. 2 is a plan view of the plastic bag of FIG. 1 after one end thereof has been invaginated, infolded or turned into the bag in its normally deflated condition;

FIG. 3 is an enlarged perspective view of an outer truncated, conical casing into which the deflated, cup shaped bag of FIG. 2 is placed;

FIG. 4 is a perspective view of the casing of FIG. 3 showing the smaller end enlarged and open to pass over the uterine mass;

FIG. 5 is a schematic view on a reduced scale of the casing of FIG. 3 assembled, with the normally deflated bag enveloping and receiving the prolapsed uterus and with the mass being reduced in diameter by pressure;

FIG. 6 is a similar schematic view of the uterus after reduction in diameter and when partially replaced by pressure of the apparatus of the invention;

FIG. 7 is a similar schematic view of the apparatus showing the uterus fully replaced in the abdominal cavity of the cow;

FIG. 8 is a similar schematic diagram of another embodiment of the invention.

DESCRIPTION OF THE DRAWINGS

As shown in the drawing, the instrument 8 of the invention includes an enclosure means 9 of frusto-conical, funnel-shaped, tapered configuration and of non-expansible material 10, a pressure applying means 11, of impervious, flexible, sheet material 12, forming a fluid pressure chamber 13, a fluid pressure control means 14 and an anchoring means 15.

Referring to FIG. 1, the pressure applying means 11 of the invention is preferably in the form of a generally cylindrical, elongated, sausage-shaped air bag 16 having a fluid inlet tube 17 in the rear wall 18 and having a front wall 19. The bag is shown fully inflated in FIG. 1, but it is normally deflated ready for use, as shown in FIG. 2. The front wall 19 is invaginated, infolded or inturned to proximate the rear wall 18, to form a double walled, cup-shaped receptacle, or inner cavity, 21 of sufficient size to envelop and receive the prolapsed uterus. The deflated cup-shaped bag 16 has an opening 22 at the front end.

It will be understood that the prolapsed uterus 30, of the animal, such as a cow 31, hangs from the vagina in a large pear shaped mass and is inverted inside out. The vagina, or vulva, area is designated 32 and the fundus of the uterus is designated 33. The deflated bag 16 is sheathed over the pear-shaped mass of the uterus, the smooth, impervious, flexible sheet material of the bag inflicting no damage to the inflamed organ.

The enclosure means 9 of the instrument 10 is in the form of a truncated-conical casing 23, of non-expansible, pressure resistant material, for example a semi-rigid sheet of plastic such as polypropylene.

As shown in FIGS. 3 and 4, the casing 23 includes a conical, tapered side wall 24, having a longitudinally extending slit, or split, 26 therein proximate the open small end 25. The portions of the side wall 24 defining slit 26 tend to overlap as at 27 to form a constricted opening 28 at the small end and to permit the small end 25 to be inserted into the vagina and then expand to an opening of greater diameter under radial pressure. A stretchable, elastic restraining member 29 is secured to the overlapping portion 34 and detachably connected by fasteners 36 to the overlapped portion 37. The fasteners 36 may be unfastened to permit the overlapping portion 34 to serve as a closure member, the portion 34 being bent outwardly to increase the size of the opening of the small end 25 while the enclosure means is slid over the uterine mass 30, enveloped in the cup-shaped receptacle 16. When the uterus and bag are in position within the casing 25, the fasteners 36 are again connected to make the tapered wall 24 pressure resistant.

Fluid pressure control means 14 includes a source of fluid under pressure 39, such as in air pump, compressor tank or the like, or a compressed gas cartridge, the flexible inlet tube 17 connecting the source 39 with the pressure chamber 13 and a suitable pressure control valve 40 in the tube 17 for regulating the inflation of the bag 16.

Anchoring means 42 is provided for maintaining the casing 23 in position with the bag sheathed uterine mass contained therein and the small end 25 in the vagina. Means 42 includes the belly band 43, a harness band 44 and suitable adjustable straps 45 leading to the exterior of the casing 23.

Preferably the casing 23 includes a pair of handles such as 47, the control valve 40 being in one of the handles 50 so that one person alone can handle the instrument 10.

When the uterine mass 30 has been enveloped in the cup-shaped receptacle 16, the casing 23 opened, slid over the sheathed mass and closed, the end 25 guided into the vagina and the casing 23 anchored in place. The introduction of fluid into chamber 13 causes substantially uniform pressure to be exerted on the mass to gradually reduce its diameter with no danger of puncturing, laceration or hemorrhaging. Further application of pressure causes the uterine mass to be discharged through the open end 25, which expands to a greater diameter, until the uterus has fallen back into its normal position in the abdominal cavity 49. The inflated bag 16 is then pressing against the inside of the uterus to smooth out any wrinkles and may be kept inflated in position as long as necessary to insure retention and avoid a second prolapse.

As shown in FIG. 8, while not as advantageous as a double walled, invaginated bag 16, a pressure applying means 11 in the form of a flexible diaphragm 52, may be used, the diaphragm 52 forming a pressure chamber 13 with the interior of the casing 23.

Thus the apparatus of the invention can be used by one man and provides means to handle infected and friable tissues with minimum damage thereto and a greatly reduced chance of infection thereof. The air pressure distributed over a very large part of the cow's uterus allows a reduction of edema, an effective control over hemorrhage, and the return of body fluids to the circulatory system helping to counteract shock.

What is claimed is:

1. A veterinary instrument for replacing the prolapsed uterus of an animal, said uterus hanging inside out in a large pear-shaped mass from the vagina, without lacerating, puncturing or hemorrhaging said uterus, said instrument comprising:
   enclosure means of expansion resistant material and generally frusto-conical configuration, said means having an open small end adapted to be inserted into said vagina and being adapted to receive the said mass of said uterus from vulva to fundus;
   expansible means on said enclosure means at said open small end thereof for widening the opening therein to admit an uterus thereinto and for narrowing said opening to conform to vagina size;
   normally deflated, inflatable pressure- applying means of flexible imperious sheet material mounted within said enclosure means and forming an open ended bag for enveloping the said mass of said uterus;
   fluid pressure control means, connecting said pressure applying means to a source of fluid pressure, for gradually inflating said pressure applying means to first compress said mass with relatively uniform pressure into a smaller mass and then discharging said mass through the open end of said enclosure means and back into the abdominal cavity,
   and anchoring means, on said enclosure means for retaining the same during the application of said fluid pressure.

2. A veterinary instrument as specified in claim 1 wherein:
   said enclosure means is formed of sheet material and said expansible means comprises a longitudinal side wall opening and closure means for said opening, said means extending to said small end and being openable to receive said mass and closable to narrow said opening.

3. A veterinary instrument as specified in claim 1 wherein:
   said pressure applying means is a sausage-shaped air bag, with one end invaginated to proximate the other end to form a deflated, double-walled, cup-like receptacle within said enclosure means for receiving said mass.

4. A veterinary instrument as specified in claim 1 wherein:
   said small end of said enclosure means is normally of constricted diameter to easily fit in said vagina, and said expansible means at said small end includes resilient stretchable means therein for permitting said small end to enlarge during the passage of said mass.

5. A veterinary instrument as specified in claim 1 wherein:
   said enclosure means is a truncated, conical container of semi-rigid sheet material having a circular wall at the large end and said expansible means includes a longitudinal split extending from the small open end, rearwardly and for expansion and contraction of the opening therein.

6. The method of replacement of uterine prolapse in animals by means of an impervious, flexible sheet forming a fluid pressure chamber in a tapered container having an open small end, which comprises the steps of:
   widening said open small end to admit a prolapsed uterus into said container, inserting said uterus through said widened end,
   forming a cup-shaped receptacle in said sheet and enveloping said receptacle around said prolapsed uterus with the fundus of the uterus proximate the bottom of said receptacle within said container;
   narrowing said small end and anchoring said tapered container, with the open small end thereof in the vagina and with the prolapsed uterine mass enveloped in said cup-shaped receptacle within said container;

introducing fluid into said chamber to apply uniform pressure on said sheet for reducing the size of the uterine mass; and continuing to introduce fluid into said chamber until said reduced mass is invaginated through said open small end and returned to normal position in the abdominal cavity.

7. Apparatus suitable for replacing and reorienting a prolapsed uterus of a cow or the like, said apparatus comprising:

a casing having a tapered end terminating in an aperture at the smaller end thereof;

means for widening said aperture to admit a uterus into said casing;

expansible, resilient means on said casing to provide for adjustment in aperture size in response to internal and external pressures on said casing;

means for admitting a pressurized fluid into said casing; and a flexible bag member for receiving a uterus mounted in said casing between said pressurized fluid and said aperture;

said bag member, when pressurized, being inflated to propel said prolapsed uterus back into the abdominal cavity of said cow to the proper location.

8. Apparatus as defined in claim 7 wherein said tapered end is frusto-conical in shape and includes a longitudinal slit extending rearwardly from said small aperture toward the large end of said casing, said slit providing means for overlapping adjacent sections of the casing, thereby adjusting the size of said aperture.

9. Apparatus as defined in claim 8 wherein said adjacent sections of the casing are connected by said expansible resilient means to provide continuous response of the small end of said casing to internal and external pressures thereon.

10. Apparatus as defined in claim 7 wherein said flexible bag member comprises a double-walled bag having a cup-shaped fluid pressure chamber and a cup-shaped uterus-receiving chamber, said uterus receiving chamber being adapted for turning inside out on application of pressure to said pressure chamber.

11. Apparatus as defined in claim 7 wherein said flexible bag member is a cup-shaped diaphragm mounted in said casing.

12. Apparatus as defined in claim 7 plus handle means on said casing including fluid pressure control means as an integral part thereof.

References Cited

UNITED STATES PATENTS

| | | | |
|---|---|---|---|
| 5,556 | 5/1848 | Gescheidt | 128—129 |
| 476,698 | 6/1892 | Taylor | 128—129 |
| 1,098,222 | 5/1914 | Brasefield | 128—262 |
| 1,213,005 | 1/1917 | Pillsbury | 128—129 |
| 3,081,773 | 3/1963 | Isaac | 128—303 |
| 3,168,092 | 2/1965 | Silverman | 128—344 X |

FOREIGN PATENTS 1,239,432  4/1967  Germany.

DALTON L. TRULUCK, Primary Examiner

U.S. Cl. X.R.

128—129, 262, 361